No. 663,201. Patented Dec. 4, 1900.
DE WITT C. WALLACE.
CAR FENDER.
(Application filed Apr. 30, 1900.)
(No Model.) 2 Sheets—Sheet 1.
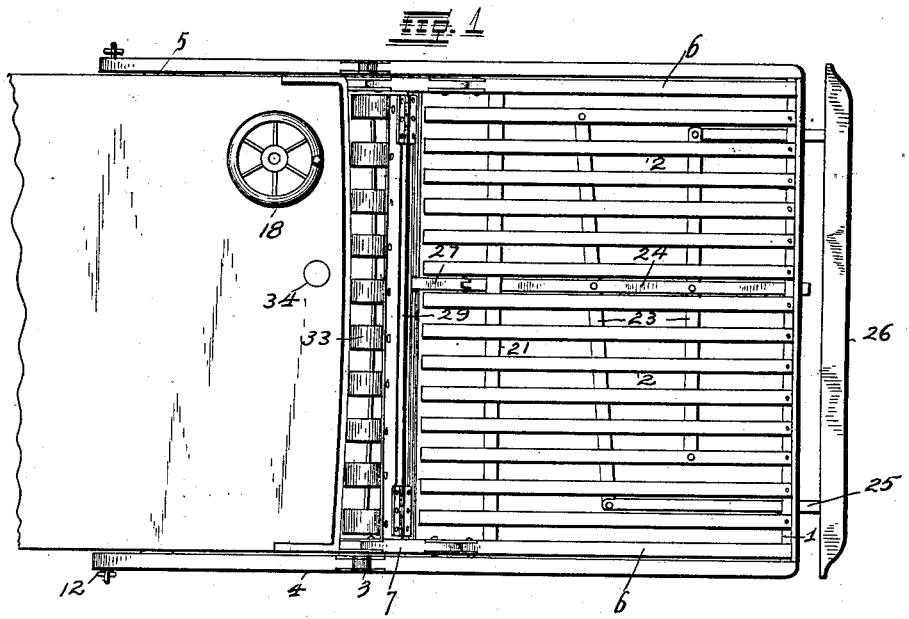
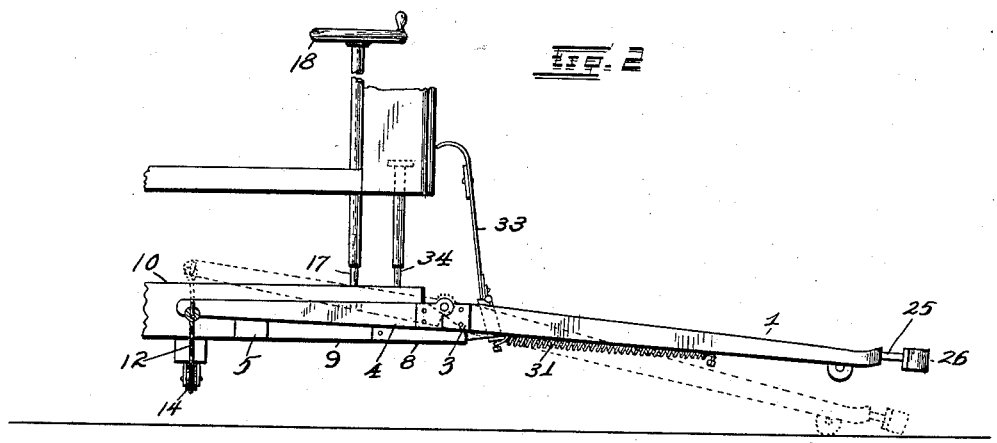
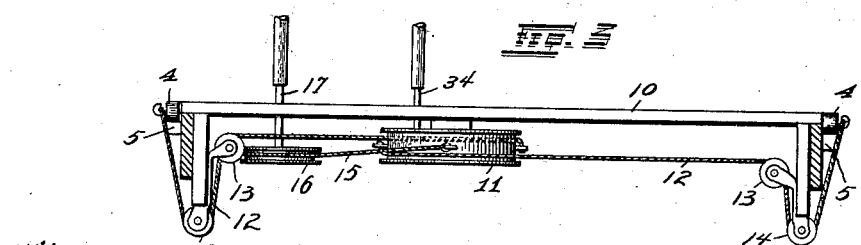
Witnesses.
Alfred A. Eicker
J. D. Rippy
Inventor
De Witt C. Wallace.
By Higdon & Longan. Atty's.
THE NORRIS PETERS CO., PHOTO-LITHO., WASHINGTON, D. C.

No. 663,201. Patented Dec. 4, 1900.
DE WITT C. WALLACE.
CAR FENDER.
(Application filed Apr. 30, 1900.)
(No Model.) 2 Sheets—Sheet 2.
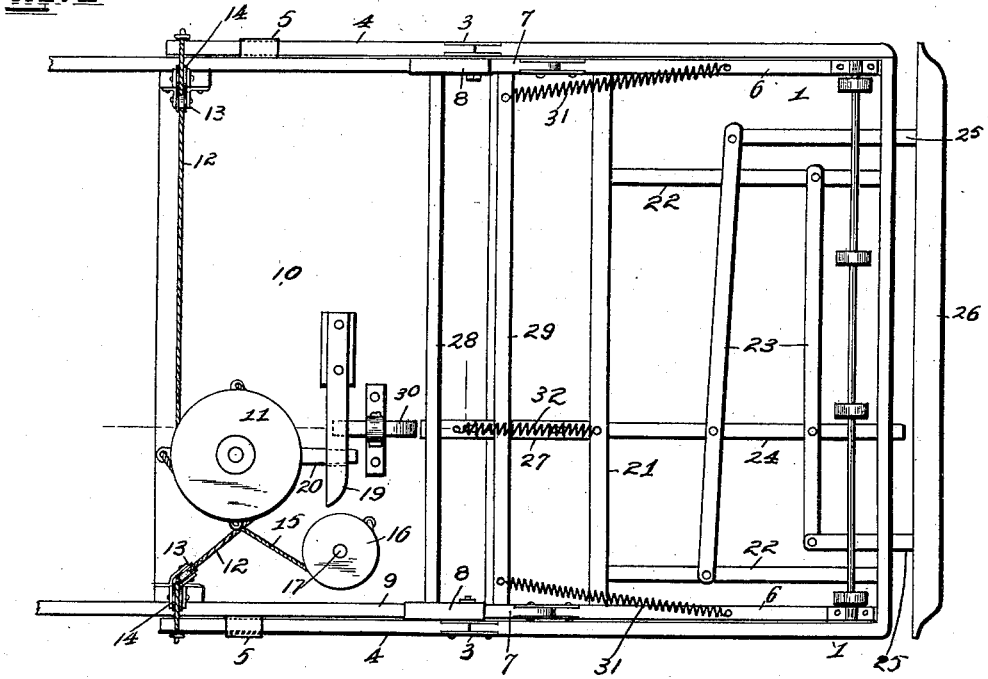
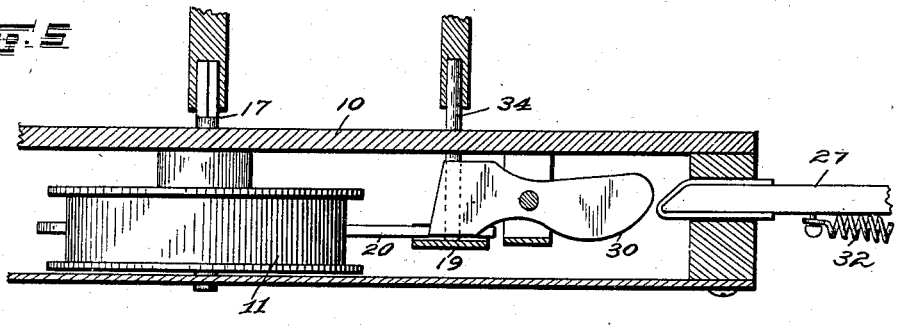
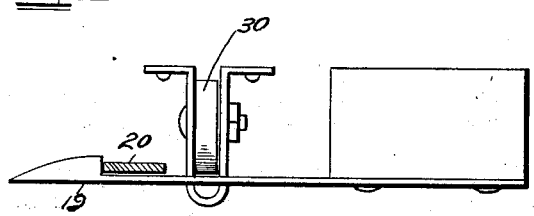
Witnesses.
Alfred A Eicker
J D Rippey
Inventor.
De Witt C. Wallace
By Higdon & Longan Attys.

UNITED STATES PATENT OFFICE.

DE WITT C. WALLACE, OF CAIRO, ILLINOIS, ASSIGNOR OF ONE-HALF TO JOHN T. RENNIE, OF SAME PLACE.

CAR-FENDER.

SPECIFICATION forming part of Letters Patent No. 663,201, dated December 4, 1900.

Application filed April 30, 1900. Serial No. 14,945. (No model.)

*To all whom it may concern:*

Be it known that I, DE WITT C. WALLACE, of the city of Cairo, Alexander county, State of Illinois, have invented certain new and useful Improvements in Car-Fenders, of which the following is a full, clear, and exact description, reference being had to the accompanying drawings, forming a part hereof.

This invention relates to car-fenders; and it consists of the novel construction, combination, and arrangement of parts hereinafter shown, described, and claimed.

Figure 1 is a top plan view of the device when in use. Fig. 2 is a side elevation thereof. Fig. 3 is a rear elevation. Fig. 4 is a view from below, showing the arrangement of the levers which I employ in my invention, all other parts being omitted to avoid complication. Figs. 5 and 6 are detail views showing the arrangement of the lock which is made use of in carrying out the invention.

In carrying out this invention I provide a framework 1, supporting a plurality of strips 2, arranged in the form of a grate in order to make the device as light as possible, and secured to the rear end of the frame 1, on each side thereof, is one half of a knuckle-joint 3, the other half being secured to a rod 4, the rear end of which rests upon a stop 5, secured in any suitable manner to the sides of the car-body.

Secured to the frame 1, on each side thereof, is a short strip 6, the rear ends of which are pivotally secured to the arms 7, the said arms being connected by means of a knuckle-joint 8 to the rearwardly-extending side plates 9. The connection formed between the strips 6 and 7 is for the purpose of allowing the car-fender to be lowered in order to receive the objects from the car-track, while the connection 8 between the strips 7 and 9 is for the purpose of allowing the said fender to be raised into a vertical position when it is not desired to use the same.

Secured to the plates 9 is a platform 10, on the under side of which is rotatably carried a spool 11. To diametrically opposite sides of the spool 11 are secured the inner ends of ropes or other suitable connections, the opposite ends of which are carried outwardly and passed over the small pulleys 13, carried by the under side of the platform 10, and thence downwardly over other small pulleys 14 and connected at their outer ends to the rear ends of the arms 4. By this means it can readily be seen that as the spool 11 is rotated in order to draw the ropes 12 about the same the rear ends of the arms 4 will be drawn downwardly, which will necessarily elevate the forward end of the car-fender. Secured to one side of the spool 11 between the ends of the ropes 12 is another connection 15, the opposite end of which is carried forwardly and secured to another spool 16, the same being carried upon the lower end of a shaft 17, the said shaft being rotatably journaled in bearings in the bottom of the car-body, and upon the upper end of said shaft is keyed a hand-wheel 18. By this means the spool 11 can be rotated by operating the hand-wheel 18, and the forward end of the car-fender can be elevated because of the connections formed by the ropes 12 and the arms 4.

The forward end of the fender is normally retained at a suitable elevation above the ground or track, and the means by which this is accomplished comprises the lock-spring 19, which engages the metallic strip 20, secured to one side of the spool 11. By this means when the said spool is rotated and the ends of the arms 4 are drawn downwardly the forward end of the fender will be drawn upwardly, as hereinbefore explained, and will be retained in the desired adjustment.

Secured to the under side of the fender, near the rear end thereof, is a transverse strip 21, and supported by the said strip and the forward end of the fender-frame, near each side thereof, is an arm 22, pivotally secured to each of which is a lever 23, said levers also being secured to a rod 24, slidably carried above the strip 21 and the forward end of the fender-frame. Connected to the free end of each of the levers 23 is a forwardly-projecting arm 25, and carried by the said arm is a transverse bar 26. The rear end of the arm 24 is pivotally connected to a bar 27, the said bar being supported above the transverse rods 28 and 29, carried by the strips 7 and 9, respectively. The rear end of the bar 27 when pushed rearwardly contacts with a pawl 30, raises the same upwardly, and pushes the lock-spring 19 downwardly by the said pawl, which frees the arm 20 and allows the spool 11 to rotate freely, thereby permitting the forward end of the car-fender to lower upon the track. This operation is performed automatically when any object strikes against the bar 26 and presses it rearwardly, the said bar contacting with the forward end of the bar 24, thereby operating the pawl 30 and the lock-spring 19.

To accelerate the downward movement of the car-fender when any object is struck by the bar 26, I provide retractile coil-springs 31, the forward ends of which are secured to the strips 6 and the rear ends of the strips 29. A coil-spring 32, secured to the strip 21 and to the bar 27, normally holds the said bar out of contact with the pawl 30, thereby permitting the car-fender to remain in its normal elevated position.

Supported above the rear end of the car-fender is a receiver 33, which is adapted to receive the force of any object which is caught upon the fender and prevent the same from striking against the draw-bar. The lock-spring 19 may also be operated from above the car-body by pressing downwardly upon the pin 34, the lower end of which rests upon the said spring and the upper end projecting through an aperture in the bottom of the car-body.

I claim—

1. A car-fender, comprising a frame, a fender secured to said frame, a spool, means for rotating said spool, means whereby the fender may be elevated and lowered when the said spool is rotated and means whereby the fender is allowed to assume an inclined position when the forward end thereof contacts with any object, substantially as specified.

2. A car-fender, comprising a frame, a fender secured to the said frame, a spool, means for drawing the fender in a horizontal position whenever the said spool is rotated, means whereby the fender is allowed to assume an inclined position when any object is struck thereby, means above the car-body for rotating the said spool and thereby drawing the fender again into a horizontal position and means whereby the fender may be drawn into a vertical position, substantially as specified.

3. In a car-fender, a frame, a spool carried adjacent to said frame, flexible connections between said frame and said spool, means for winding the said connections around said spool thereby elevating the forward end of the fender, and means for unwinding said connections, substantially as specified.

4. In a car-fender, a frame, a spool carried adjacent to said frame, connections between said frame and said spool, means for winding said connections around said spool, means for holding the said spool, and means for automatically releasing said spool when the forward end of the fender contacts with any object, substantially as specified.

In testimony whereof I affix my signature in presence of two witnesses.

DE WITT C. WALLACE.

Witnesses:
CHAS. H. LEHRER,
MINGO P. GLATFELTER.